United States Patent
Lemon et al.

(10) Patent No.: US 6,736,425 B2
(45) Date of Patent: May 18, 2004

(54) SYSTEM FOR VENTING AN AIR BAG MODULE

(75) Inventors: Robert David Lemon, Plymouth, MI (US); Sean Timothy Ryan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 09/683,630

(22) Filed: Jan. 28, 2002

(65) Prior Publication Data

US 2003/0141706 A1 Jul. 31, 2003

(51) Int. Cl.[7] .......................... B06R 21/28; B06R 21/26; B06R 21/16
(52) U.S. Cl. ..................... 280/739; 280/728.2; 280/736; 280/742
(58) Field of Search ................................. 280/736, 739, 280/742, 728.2

(56) References Cited

U.S. PATENT DOCUMENTS

| | | | |
|---|---|---|---|
| 3,787,067 A | * | 1/1974 | Bernard ...................... 280/736 |
| 3,884,499 A | | 5/1975 | Oka et al. |
| 3,944,250 A | | 3/1976 | Wulf et al. |
| 4,071,187 A | | 1/1978 | LaFleur |
| 4,097,065 A | | 6/1978 | Okada et al. |
| 4,111,458 A | | 9/1978 | Okada et al. |
| 4,532,652 A | | 7/1985 | Herrington |
| 4,805,930 A | | 2/1989 | Takada |
| 4,877,264 A | | 10/1989 | Cuevas |
| 5,004,123 A | | 4/1991 | Stoody |
| 5,007,662 A | | 4/1991 | Abramczyk et al. |
| 5,044,663 A | | 9/1991 | Seizert |
| RE33,938 E | | 5/1992 | Cuevas |
| 5,161,776 A | | 11/1992 | Nicholson |
| 5,219,179 A | | 6/1993 | Eyrainer et al. |
| 5,234,229 A | | 8/1993 | Gordon |
| 5,280,953 A | | 1/1994 | Wolanin et al. |
| 5,310,215 A | | 5/1994 | Wallner |
| 5,332,257 A | | 7/1994 | Rogers et al. |
| 5,332,259 A | | 7/1994 | Conlee et al. |
| 5,340,151 A | | 8/1994 | Sato |
| 5,366,242 A | | 11/1994 | Faigle et al. |
| 5,398,960 A | | 3/1995 | Ravenberg et al. |
| 5,439,032 A | | 8/1995 | Petrone |
| 5,478,111 A | | 12/1995 | Marchant et al. |
| 5,492,364 A | | 2/1996 | Anderson et al. |
| 5,501,487 A | * | 3/1996 | Trevillyan et al. .......... 280/736 |
| 5,531,476 A | | 7/1996 | Kerne |
| 5,603,526 A | | 2/1997 | Buchanan |
| 5,634,659 A | | 6/1997 | Abraham |
| 5,647,607 A | | 7/1997 | Bolieau |
| 5,664,802 A | | 9/1997 | Harris et al. |
| 5,664,807 A | | 9/1997 | Bohmler |
| 5,669,628 A | | 9/1997 | Kaufmann et al. |
| 5,681,052 A | | 10/1997 | Ricks et al. |

(List continued on next page.)

FOREIGN PATENT DOCUMENTS

| | | |
|---|---|---|
| DE | 43 06 615 A1 | 3/1993 |
| JP | 408072648 A | 3/1996 |
| JP | 408188112 A | 7/1996 |
| JP | 410076908 A | 3/1998 |
| JP | 02001277992 | 10/2001 |

*Primary Examiner*—Ruth Ilan
(74) *Attorney, Agent, or Firm*—Gary Smith

(57) ABSTRACT

A system for venting an air bag module having an air bag cushion retainer ring, an air bag cushion, an inflator, at least one spring positioned and compressed between the inflator and the air bag cushion retainer ring, a pyrotechnic rivet, sensors, and a restraint control module. If variable venting is required, the restraint control module signals the pyrotechnic rivet to release and the spring to urge one of the inflator or air bag cushion retainer ring away from the other of the inflator or air bag cushion retainer ring to create an opening between the retainer ring and the inflator to allow venting of the gas from inside the air bag cushion.

14 Claims, 3 Drawing Sheets

U.S. PATENT DOCUMENTS

| | | | |
|---|---|---|---|
| 5,695,214 A | * 12/1997 | Faigle et al. | ................. 280/735 |
| 5,704,639 A | 1/1998 | Cundill et al. | |
| 5,743,558 A | 4/1998 | Seymour | |
| 5,762,364 A | 6/1998 | Cuevas | |
| 5,779,265 A | 7/1998 | Rose et al. | |
| 5,813,693 A | 9/1998 | Gordon et al. | |
| 5,820,162 A | * 10/1998 | Fink | ........................... 280/742 |
| 5,839,755 A | 11/1998 | Turnbull | |
| 5,848,805 A | 12/1998 | Sogi et al. | |
| 5,853,192 A | 12/1998 | Sikorski et al. | |
| 5,871,231 A | 2/1999 | Richards et al. | |
| 5,882,036 A | 3/1999 | Moore et al. | |
| 5,887,894 A | 3/1999 | Castagner et al. | |
| 5,918,901 A | 7/1999 | Johnson et al. | |
| 5,941,557 A | 8/1999 | Mullins, Jr. et al. | |
| 5,947,512 A | 9/1999 | Magoteaux et al. | |
| 5,967,551 A | 10/1999 | Newkirk et al. | |
| 5,984,352 A | * 11/1999 | Green et al. | ................. 280/736 |
| 5,988,677 A | 11/1999 | Adomeit et al. | |
| 5,997,037 A | 12/1999 | Hill et al. | |
| 6,022,046 A | 2/2000 | Isomura et al. | |
| 6,053,527 A | 4/2000 | Gans et al. | |
| 6,056,318 A | 5/2000 | Braunschadel | |
| 6,082,765 A | 7/2000 | Bowers et al. | |
| 6,086,096 A | 7/2000 | Link et al. | |
| 6,106,002 A | * 8/2000 | Haesaert et al. | ......... 280/728.2 |
| 6,131,943 A | 10/2000 | Breitweg | |
| 6,142,517 A | 11/2000 | Nakamura et al. | |
| 6,158,770 A | 12/2000 | Ryan et al. | |
| 6,170,859 B1 | 1/2001 | Kausch | |
| 6,179,322 B1 | 1/2001 | Faigle et al. | |
| 6,183,003 B1 | 2/2001 | Matsuhashi et al. | |
| 6,189,924 B1 | 2/2001 | Hock | |
| 6,189,926 B1 | 2/2001 | Smith | |
| 6,206,408 B1 | 3/2001 | Schneider | |
| 6,206,417 B1 | 3/2001 | Soderquist et al. | |
| 6,224,583 B1 | 5/2001 | Perkins et al. | |
| 6,241,283 B1 | 6/2001 | Zarazua | |
| 6,250,677 B1 | 6/2001 | Fujimura | |
| 6,254,121 B1 | 7/2001 | Fowler et al. | |
| 6,254,129 B1 | 7/2001 | Rink et al. | |
| 6,254,130 B1 | 7/2001 | Jayaraman et al. | |
| 6,290,257 B1 | 9/2001 | Bunce et al. | |
| 6,406,055 B1 | * 6/2002 | Faigle et al. | ............. 280/728.2 |
| 6,497,431 B1 | * 12/2002 | Schramm | ..................... 280/736 |
| 6,547,276 B2 | * 4/2003 | Heilig | ........................ 280/739 |
| 6,588,795 B2 | * 7/2003 | Fischer et al. | ............... 280/736 |
| 2002/0125703 A1 | * 9/2002 | Reiter et al. | ................. 280/739 |

\* cited by examiner

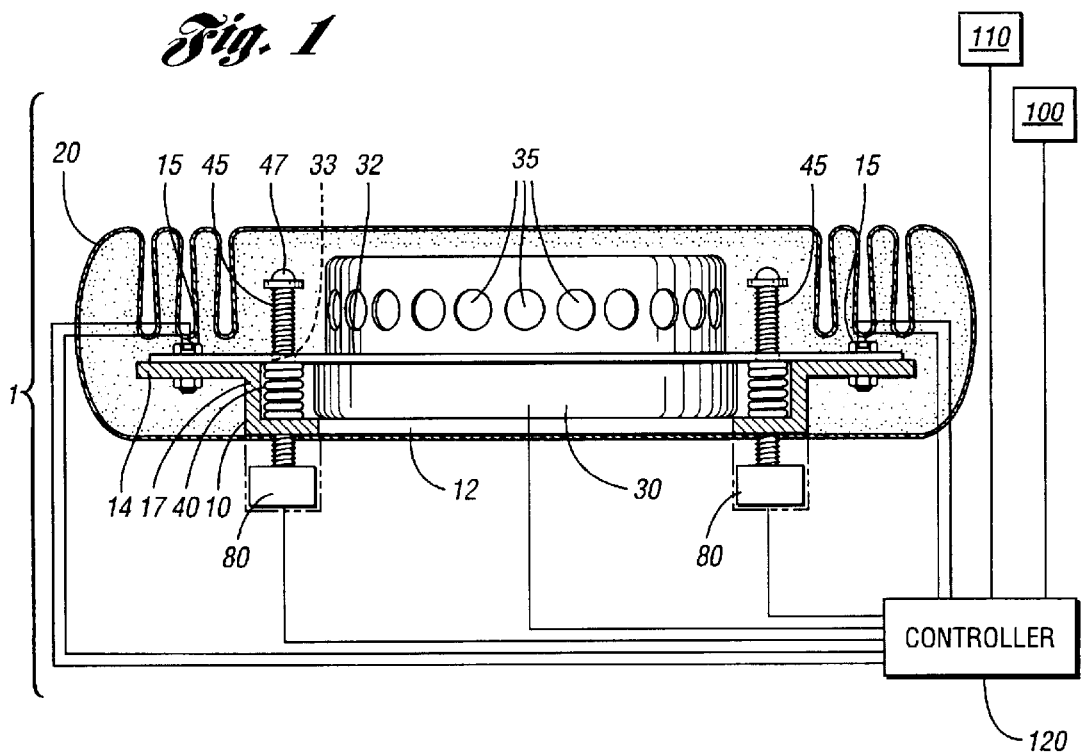
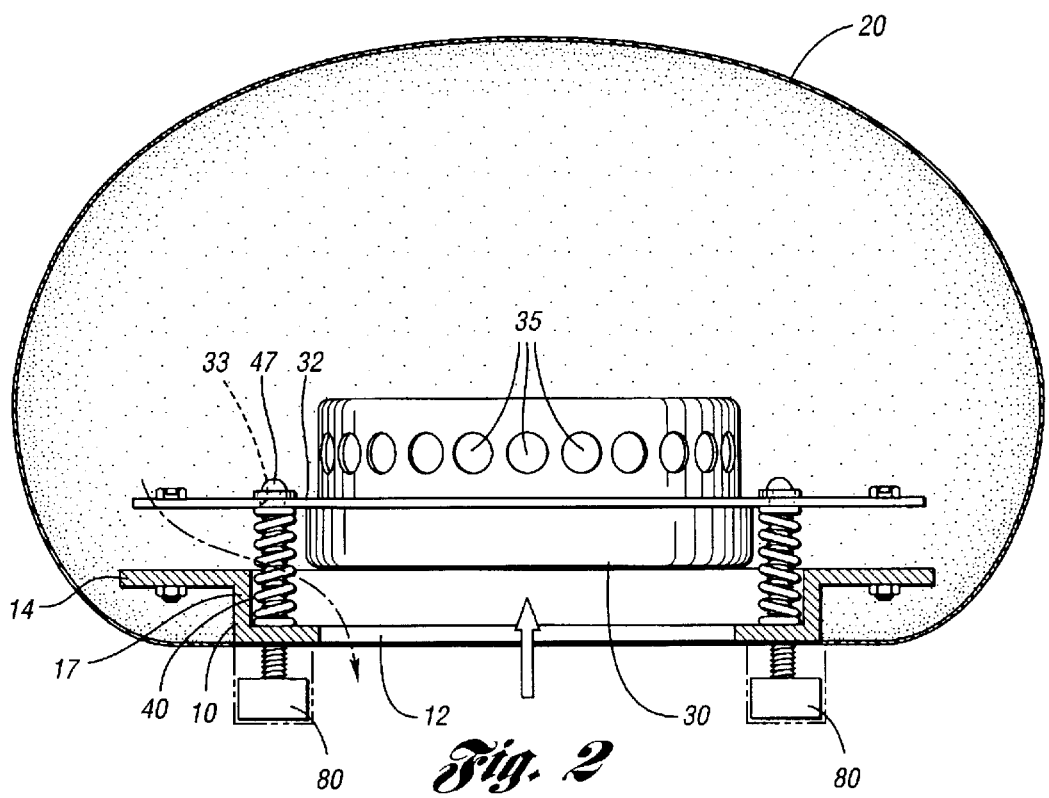

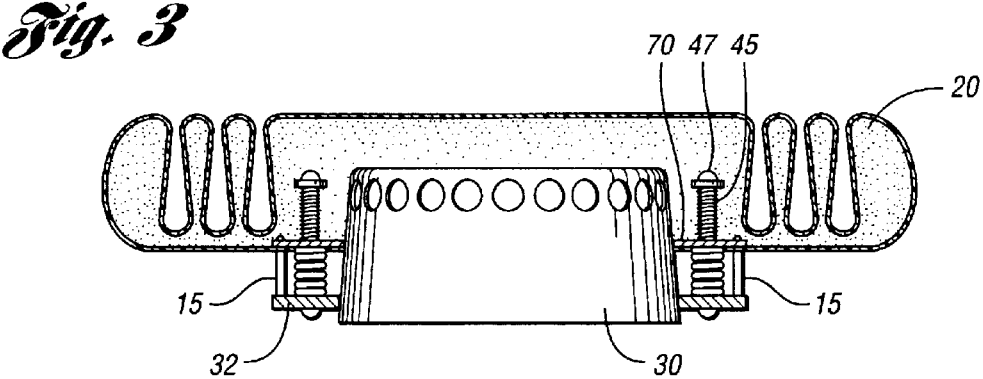
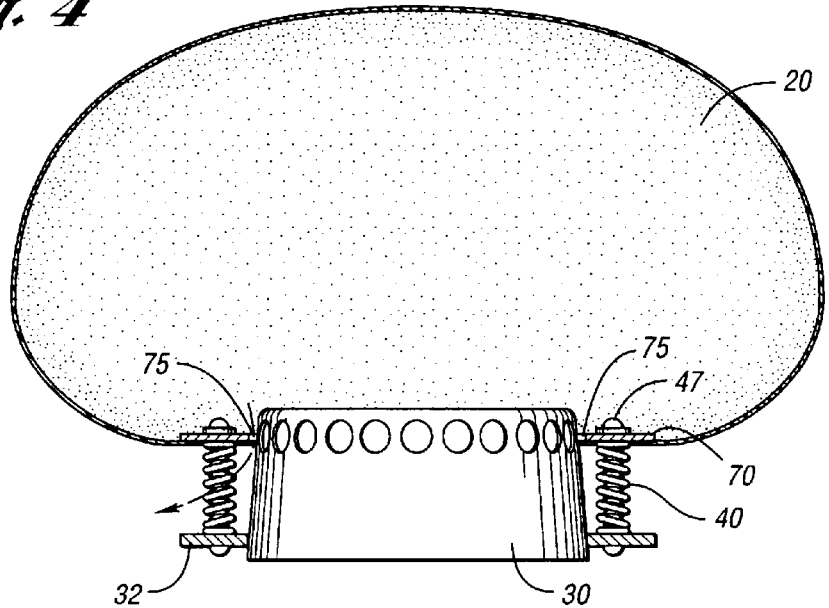
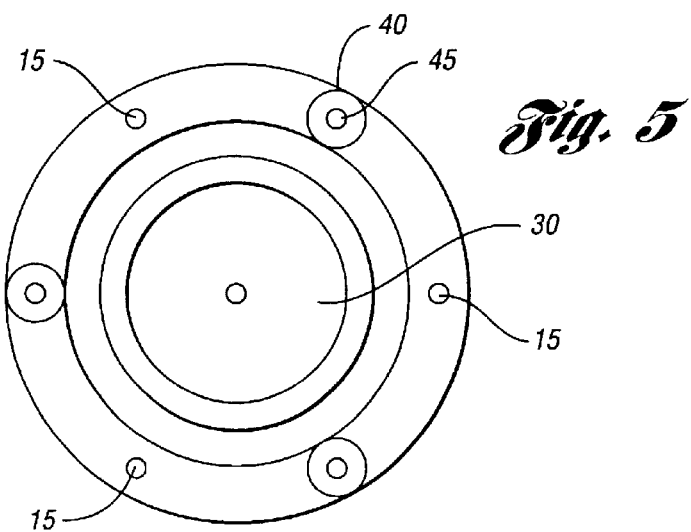

SYSTEM FOR VENTING AN AIR BAG MODULE

BACKGROUND OF INVENTION

1. Field of the Invention

This invention relates generally to passenger vehicle occupant restraint systems having air bag modules and, more particularly, to a system for venting an air bag module.

2. Background Art

Occupant restraint systems employing air bag modules are well known. During a collision of a predetermined magnitude, an air bag cushion is inflated by an inflator and is deployed in the vehicle for protection of the vehicle occupant. The air bag cushion is deployed at a relatively high rate of speed and force optimized to protect a wide range of occupants under various conditions. There are, however, times when a reduced amount of air bag cushion pressure and force is desired, e.g., when an occupant is out of position during the vehicle impact, during a less severe accident, when the occupant is properly belted, or when the occupant is of a smaller stature. Various vehicle occupant restraint systems having air bag modules have been designed to vent gas from the air bag cushion, thereby reducing the force of the air bag deployment. One technique uses vents on the air bag cushion which are always open. In other systems, vents in the air bag cushion are opened when the pressure inside the air bag cushion reaches a predetermined level. However, these systems are dependent on external forces, such as an out of place occupant, causing the pressure inside the air bag cushion to reach a predetermined level and do not take into account any other crash factors.

In another system disclosed in U.S. Pat. No. 5,234,229, issued to Gordon, an air bag inflator is connected to a base plate using retainer posts to allow fore-and-aft movement of the air bag inflator. Springs bias the inflator through an opening in the base plate and create a seal. An air bag cushion is attached to the base plate around the periphery of the opening, thereby creating a sealed or closed system encompassing the inflator. During a collision, the inflator inflates the air bag cushion. When a predetermined amount of external force is applied to the air bag cushion such that it compresses the springs, the inflator is pushed back away from the base plate breaking the seal and gas is vented. This decreases the pressure in the air bag cushion. This system is also dependent only on the amount of force exerted on the air bag cushion and does not take into account other crash factors.

It would be desirable to provide a variable venting occupant restraining system comprising an air bag module which is selectively activated based on the occupant and the crash conditions.

SUMMARY OF INVENTION

It is an object of this invention to provide a variable venting occupant restraining system comprising an air bag module wherein the deployment of the air bag cushion is dependent on the occupant and other crash conditions.

Accordingly, this invention features a system for venting an air bag module comprising an air bag cushion retainer ring, an air bag cushion secured to the air bag cushion retainer ring, an inflator for generating gas to inflate the air bag cushion, at least one spring positioned and compressed between the inflator and the air bag cushion retainer ring such that the spring biases the inflator away from the air bag cushion retainer ring, a quick-release device securing the air bag cushion retainer ring to the inflator and maintaining the spring in a compressed position, sensors to sense occupant and crash information, and a restraint control module electrically connected to the quick-release device and for receiving information from the sensors and computing if venting is required. If variable venting is required, the restraint control module signals the quick-release device to release the air bag cushion retainer ring from the inflator and to allow the spring to urge one of the inflator or air bag cushion retainer ring away from the other of the inflator or air bag cushion retainer ring to create an opening between the retainer ring and the inflator to allow venting of the gas from inside the air bag cushion.

In one embodiment, the inflator is urged away from the air bag cushion retainer ring. In a second embodiment, the air bag cushion retainer ring is urged away from the inflator.

The quick-release device may be pyrotechnic rivets or other quick release methods.

These and other objects of this invention will be more readily apparent upon reference to the following detailed description.

BRIEF DESCRIPTION OF DRAWINGS

FIG. 1 is a side view of the variable vent air bag module of the present invention in the pre-deployment condition;

FIG. 2 is a side view of the variable vent air bag module of the present invention in the deployed state;

FIG. 3 is a side view of a second embodiment of the variable vent air bag module of the present invention in an pre-deployed state;

FIG. 4 is a side view of the second embodiment of the variable vent air bag module of the present invention in the deployed state;

FIG. 5 is a plan view of the second embodiment of the variable vent air bag module of the present system.

DETAILED DESCRIPTION

Figure 6:
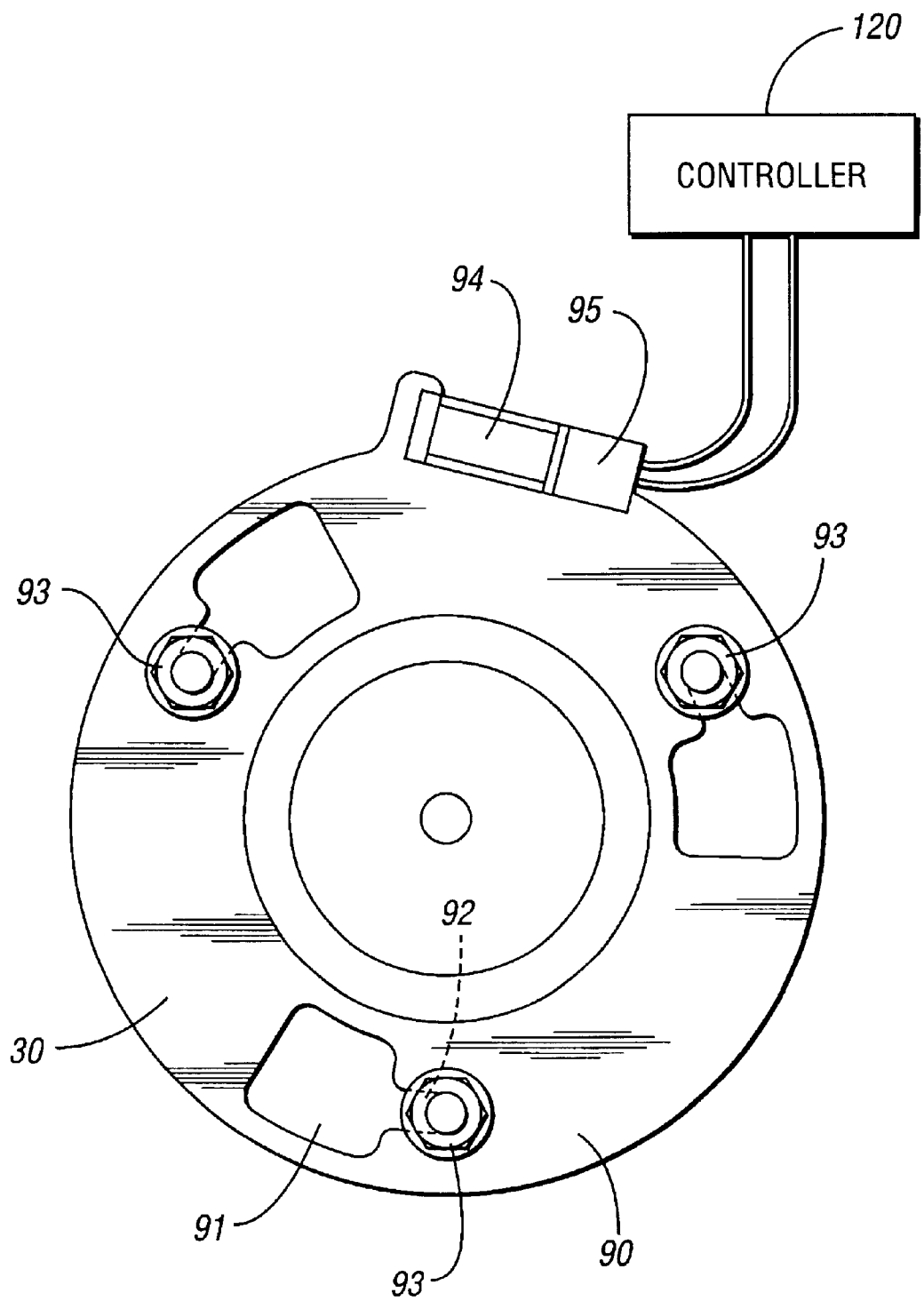
FIG. 6 is a plan view of a quick release mechanism of the variable vent air bag module of the present invention.

Referring now to FIG. 1, the first embodiment of the variable venting occupant restraint system 1 is shown in its pre-deployment condition. FIG. 2 illustrates the first embodiment of the variable venting occupant restraint system 1 in a post-deployment condition. The occupant restraint system 1 comprises an air bag module comprising in its most basic form an air bag cushion 20, an air bag cushion retainer ring 10, and an inflator 30.

The air bag cushion retainer ring 10 is attached to some vehicle structure (not shown) such as the steering column for a driver's side occupant restraint system. The present invention can also be applied to other restraint systems, such as, but not limited to, passenger and side vehicle occupant restraint systems. The air bag cushion retainer ring 10 has an opening 12. The retainer ring 10 is stepped having a forward flange 14 and a step 17.

According to one possible method of assembling the present invention, at least one vent post 45 is attached using known methods to the air bag cushion retainer ring 10 and extends forward. Preferably, three vent posts 45 are used. A spring 40 is placed over each vent post 45. The springs 40 are shown as compression springs although they can be other devices having spring-like characteristics such as blocks of elastic material that are compressible but return to approximately their original dimensions when an external force is released.

Inflator 30 is provided to inflate the air bag cushion 20 with gas using any known method. Inflator 30 comprises a peripheral mounting flange 32 having a plurality of bores 33 designed to fit over vent posts 45. Inflator 30 is placed over vent posts 45 and pressed down compressing springs 40 until peripheral mounting flange 32 of inflator 30 is proximate forward flange 14 and forms a seal which at least partially, and preferably completely, prevents gas from escaping. Mounting flange 32 may contact or be in close vicinity to flange 14. The inflator 30 may also be attached to a mounting plate (not shown) having a plurality of bores to fit over vent posts 45.

Vent post stops 47 are then placed on top of vent posts 45 to limit movement of the inflator 30. Vent post stops 47 may be nuts, bolts, a welded portion, or upset ends of the vent posts. Of course, other stopping methods may also be used. The inflator 30 and air bag cushion retainer ring 10 are retained in this position by pyrotechnic rivet fasteners 15 or other quick-release mechanisms that releasably hold the inflator proximate the air bag cushion retainer ring 10. An air bag cushion 20 is then attached to rearward flange 16 of the air bag cushion retainer ring 10 using known methods. The air bag cushion is stored in a generally folded stored state to minimize storage requirements. A cover (not shown) having a surface covers the air bag cushion and provides a visually appealing surface.

In operation, occupant sensors 100 in the vehicle sense information regarding the occupant such as the occupant's size, location, and whether or not he or she is wearing a seat belt. Crash sensors 110 mounted on the vehicle determine crash conditions such as the magnitude or severity of the crash and the vehicle speed. A restraint control module 120 receives this information from sensors 100 and 110 and determines first, if the air bags should be deployed and second, whether and when extra venting is needed. If the crash is severe enough to require the deployment of the air bag cushion 20, the restraint control module 120 signals the inflator 30 to inflate the air bag cushion 20 with gas through discharge vents 35 using known methods. The air bag cushion 20 bursts through the air bag cover (not shown) and inflates inside the vehicle to protect the occupant.

When extra venting is necessary, the restraint control module 120 causes the pyrotechnic fasteners 15 or other quick-release device to release thereby releasing the air bag cushion retainer ring 10 from inflator 30. Springs 40 bias air bag inflator 30 forward until it contacts vent post stops 47 creating a peripheral vent 98 around opening 12. Gas in the air bag cushion 20 is then vented through the opening 12 in air bag retainer ring 10, thereby reducing the pressure of the air bag cushion. The venting can be tuned by varying the height of the vent post stops 47, the spring, and the timing of releasing the air bag cushion retainer ring 10 and inflator 30.

The pyrotechnic fasteners 15 may be a nut-and-bolt-type or rivet-type fastener possessing an electrical fuse and may be fired by application of an electrical pulse sent by the restraint control module 120.

In a second embodiment illustrated in FIGS. 3, 4 and 5, inflator 30 has a flange 32 which is directly attached to the vehicle using known methods. Alternatively, the inflator 30 may be attached to a reaction plate or an inflator mounting plate (not shown) which is identical in function to the flange 32 and which is in turn attached to the vehicle structure. For the purposes of this disclosure, the term inflator shall mean at least an inflator having a flange and/or an inflator attached to a reaction plate.

Vent posts 45 connect floating air bag cushion retainer ring 70 to the inflator 30. The floating air bag cushion retainer ring 70 comprises an opening 75 sized to accommodate the inflator 30 therethrough. The inflator 30 may be slightly tapered as shown to provide a passage for the gas to vent. The air bag cushion 20 is attached to the floating air bag cushion retainer ring 70 using known methods. Vent post stops 47 limit travel of the floating air bag cushion retainer ring 70 relative to the inflator 30. Springs 40 bias the floating air bag cushion retainer ring 70 away from inflator 30 and the inflator 30.

In the pre-deployment condition, floating air bag cushion retainer ring 70 is held in place proximate reaction plate 60 by pyrotechnic rivet fasteners 15 or other quick-release devices, thereby forming a seal or at least a partial seal around opening 75 to prevent gas from exiting the air bag cushion 20.

As with the previous embodiment, sensors 100 and 110 and restraint control module 120 (not shown) determine if air bag deployment is necessary and accordingly signal the inflator 30 to inflate. Venting is achieved by the actuation of the pyrotechnic rivet fasteners 15 causing the floating air bag cushion retainer ring 70 to be biased away from the inflator 30 by the springs 40. Gas is then vented through the opening 75 in floating air bag cushion retainer ring 70 to the ambient air thereby reducing the pressure within the air bag cushion 20. The floating air bag cushion retainer ring 70 could be urged back slightly to create a peripheral opening due in part to the tapered inflator 30, as shown in FIG. 5, or it could be urged further back creating a larger unobstructed opening.

In both embodiments, the amount of venting may be further controlled by adjusting the vent post stop 47. A motorized screw 80 (shown in FIGS. 1 and 2) can be used to adjust the height of vent post stops 47. The restraint control module can signal the screw motor to adjust the heights based on the occupant and/or crash conditions.

Another example of a quick release mechanism is shown in FIG. 6. A rotating retainer ring 90 is held in position relative to an inflator 30 by a plurality of bolts 93. Slots 92 positioned under the bolts 93 connect to openings 91 which are large enough for the bolts to fit through. To release the retainer ring 90, the controller 120 sends a signal to ignite a powder charge 95 which causes the piston 94 to expand thereby rotating the retainer ring. The powder charge 95 is connected to a fixed structure such as the inflator 30. The rotating retainer ring 90 rotates such that the bolts 93 are in the openings 91, thereby allowing retainer ring 90 to move away from the inflator. Alternatively, the inflator 30 can be made to rotate. The slots and openings can also be placed on the inflator 30 and either the inflator or retaining ring may be made to rotate.

Other quick release mechanisms may include electromagnetics, latches, or clamps. The restraint control module may also control these devices.

While the best mode for carrying out the invention has been described in detail, those familiar with the art to which this invention relates will recognize various alternative designs and embodiments for practicing the invention as defined by the following claims.

What is claimed is:

1. A system for venting an air bag module comprising:
 a single-piece air bag cushion retainer ring having an opening;
 an air bag cushion secured to the air bag cushion retainer ring;

an inflator for generating gas to inflate the air bag cushion;

at least one spring positioned and compressed between the inflator and the air bag cushion retainer ring such that the spring biases the inflator and the air bag cushion retainer ring away from each other, wherein the inflator is urged away from the air bag cushion retainer ring;

a quick-release device securing the air bag cushion retainer ring to the inflator and maintaining the spring in a compressed position;

sensors to sense occupant and crash information; and a restraint control module electrically connected to the quick-release device, the restraint control module capable of receiving information from the sensors and computing if venting is required;

wherein if venting is required, the restraint control module signals the quick-release device to release the air bag cushion retainer ring from the inflator to allow the spring to urge the inflator away from the air bag cushion retainer ring to create a passageway between the retainer ring and the inflator to allow venting of the gas from inside the air bag cushion.

2. A system for venting an air bag module comprising:

a single-piece air bag cushion retainer ring having an opening;

an air bag cushion secured to the air bag cushion retainer ring;

an inflator for generating gas to inflate the air bag cushion;

at least one vent post having a vent post stop, the vent post connected to the air bag cushion retainer ring and passing through a bore in the inflator such that the vent post stop mechanically stops the travel of the inflator;

at least one spring positioned and compressed between the inflator and the air bag cushion retainer ring such that the spring biases the inflator and the air bag cushion retainer ring away from each other;

a quick-release device securing the air bag cushion retainer ring to the inflator and maintaining the spring in a compressed position;

sensors to sense occupant and crash information; and a restraint control module electrically connected to the quick-release device, the restraint control module capable of receiving information from the sensors and computing if venting is required;

wherein if venting is required, the restraint control module signals the quick-release device to release the air bag cushion retainer ring from the inflator to allow the spring to urge one of the inflator or air bag cushion retainer ring away from the other of the inflator or air bag cushion retainer ring to create a passageway between the retainer ring and the inflator to allow venting of the gas from inside the air bag cushion.

3. The system for venting an air bag module of claim 2 wherein the height of the vent post stop is adjustable in response to signals from the restraint control module.

4. A system for venting an air bag module comprising:

a single-piece air bag cushion retainer ring having an opening;

an air bag cushion secured to the air bag cushion retainer ring;

an inflator for generating gas to inflate the air bag cushion;

at least one vent post having a vent post stop, the vent post connected to the inflator and passing passing through a bore in the air bag cushion retainer ring such that the vent post stop mechanically stops the travel of the air bag cushion retainer ring;

at least one spring positioned and compressed between the inflator and the air bag cushion retainer ring such that the spring biases the inflator and the air bag cushion retainer ring away from each other;

a quick-release device securing the air bag cushion retainer ring to the inflator and maintaining the spring in a compressed position;

sensors to sense occupant and crash information; and a restraint control module electrically connected to the quick-release device, the restraint control module capable of receiving information from the sensors and computing if venting is required;

wherein if venting is required, the restraint control module signals the quick-release device to release the air bag cushion retainer ring from the inflator to allow the spring to urge one of the inflator or air bag cushion retainer ring away from the other of the inflator or air bag cushion retainer ring to create a passageway between the retainer ring and the inflator to allow venting of the gas from inside the air bag cushion.

5. The system for venting an air bag module of claim 4 wherein the height of the vent post stop is adjustable in response to signals from the restraint control module.

6. A system for venting an air bag module comprising:

a single-piece air bag cushion retainer ring having an opening;

an air bag cushion secured to the air bag cushion retainer ring;

an inflator for generating gas to inflate the air bag cushion;

at least one spring positioned and compressed between the inflator and the air bag cushion retainer ring such that the spring biases the inflator and the air bag cushion retainer ring away from each other;

a quick-release device securing the air bag cushion retainer ring to the inflator and maintaining the spring in a compressed position;

sensors to sense occupant and crash information; and a restraint control module electrically connected to the quick-release device, the restraint control module capable of receiving information from the sensors and computing if venting is required;

a plurality of slots and larger openings on one of the air bag cushion retainer ring or the inflator;

a plurality of bolts attached to the other of the air bag cushion retainer ring or inflator through the slots;

a powder charge electrically connected to the restraint control module; and a piston connected to the other of the air bag cushion retainer ring or the inflator;

wherein if venting is required, the restraint control module signals the quick-release device to release the air bag cushion retainer ring from the inflator to allow the spring to urge one of the inflator or air bag cushion retainer ring away from the other of the inflator or air bag cushion retainer ring to create a passageway between the retainer ring and the inflator to allow venting of the gas from inside the air bag cushion, and wherein the restraint control module sends a signal to the powder charge causing it to detonate and move the piston which in turn causes one of the air bag cushion retainer ring or the inflator to rotate such that the bolts are in the larger openings thereby releasing one of the air bag cushion retainer ring or inflator from the other of the air bag cushion retainer ring or the inflator.

7. A variable vent air bag module comprising:

an air bag cushion retainer ring having an opening;

an air bag cushion secured to the air bag cushion retainer ring;

an inflator for generating gas to inflate the air bag cushion;

at least one spring positioned and compressed between the inflator and the air bag cushion retainer ring such that the air bag cushion retainer and the inflator are urged away from each other; and a quick-release device for securing the inflator proximate the air bag cushion retainer ring and the spring compressed;

the quick-release device being releasable to allow the at least one spring to decompress and urge the inflator away from the air bag cushion retainer ring to create a passageway between the air bag cushion retainer ring and inflator to allow venting of the gas from inside the air bag cushion through the opening in the air bag cushion retainer ring.

8. A variable vent air bag module comprising:

an air bag cushion retainer ring having an opening;

an air bag cushion secured to the air bag cushion retainer ring;

an inflator for generating gas to inflate the air bag cushion;

at least one spring positioned and compressed between the inflator and the air bag cushion retainer ring such that the air bag cushion retainer and the inflator are urged away from each other;

a quick-release device for securing the inflator proximate the air bag cushion retainer ring and the spring compressed;

the quick-release device being releasable to allow the at least one spring to decompress and urge one of the inflator or air bag cushion retainer ring away from the other of the inflator or air bag cushion retainer ring to create a passageway between the air bag cushion retainer ring and inflator to allow venting of the gas from inside the air bag cushion through the opening in the air bag cushion retainer ring; and at least one vent post having a vent post stop, the vent post connected to the air bag cushion retainer ring and passing through a bore in the inflator such that the vent post stop mechanically stops the travel of the inflator.

9. The variable vent air bag module of 8 wherein the height of the vent post stop is adjustable in response to signals from a restraint control module.

10. A variable vent air bag module comprising:

an air bag cushion retainer ring having an opening;

an air bag cushion secured to the air bag cushion retainer ring;

an inflator for generating gas to inflate the air bag cushion;

at least one spring positioned and compressed between the inflator and the air bag cushion retainer ring such that the air bag cushion retainer and the inflator are urged away from each other;

a quick-release device for securing the inflator proximate the air bag cushion retainer ring and the spring compressed;

the quick-release device being releasable to allow the at least one spring to decompress and urge one of the inflator or air bag cushion retainer ring away from the other of the inflator or air bag cushion retainer ring to create a passageway between the air bag cushion retainer ring and inflator to allow venting of the gas from inside the air bag cushion through the opening in the air bag cushion retainer ring; and at least one vent post having a vent post stop, the vent post connected to the inflator and passing through a bore in the air bag cushion retainer ring such that the vent post stop mechanically stops the travel of the air bag cushion retainer ring.

11. The variable vent air bag module of claim 10 wherein the height of the vent post stop is adjustable in response to signals from the restraint control module.

12. A variable vent air bag module comprising:

an air bag cushion retainer ring having an opening;

an air bag cushion secured to the air bag cushion retainer ring;

an inflator for generating gas to inflate the air bag cushion;

at least one spring positioned and compressed between the inflator and the air bag cushion retainer ring such that the air bag cushion retainer and the inflator are urged away from each other;

a quick-release device for securing the inflator proximate the air bag cushion retainer ring and the spring compressed, the quick-release device comprising a plurality of slots and larger openings in one of the air bag cushion retainer ring or the inflator, bolts attached to the other of the air bag cushion retainer ring or inflator through the slots, a piston on the other of the air bag cushion retainer ring or inflator, and a powder charge;

wherein when the powder charge is detonated, it moves the piston which in turn rotates one of the air bag cushion retainer ring or the inflator such that the bolts are in the larger openings and releases one of the air bag cushion retainer rings ring or inflator away from the other of the air bag retainer ring or inflator to allow the at least one spring to decompress and urge one of the inflator or air bag cushion retainer ring away from the other of the inflator or air bag cushion retainer ring to create a passageway between the air bag cushion retainer ring and inflator to allow venting of the gas from inside the air bag cushion through the opening in the air bag cushion retainer ring.

13. A variable vent air bag module comprising:

an air bag cushion retainer ring having an opening therein;

an air bag cushion attached to the air bag cushion retainer ring;

an air bag inflator to inflate the air bag cushion with gas, the inflator sized to fit within the opening in the air bag cushion retainer ring;

a plurality of springs between the air bag cushion retainer ring and the inflator;

a quick-release device securing the air bag cushion retainer ring proximate the inflator;

wherein the air bag cushion retainer ring is movable from a first position wherein the springs are compressed and the inflator and air bag cushion retainer seal the opening in the air bag cushion retainer ring to a second position wherein the springs decompress and the inflator and air bag cushion retainer ring are separated thereby allowing gas inside the air bag to vent through the opening in the air bag cushion retainer ring; and at least one vent post having a vent post stop, the vent post connected to the inflator ring and passing through a bore in the air bag cushion retainer ring such that the vent post stop mechanically stops the travel of the inflator.

14. The variable vent air bag module of claim 13 further comprising a motor to adjust the height of the vent post stop.

* * * * *